(12) United States Patent
Jingu et al.

(10) Patent No.: US 7,925,390 B2
(45) Date of Patent: Apr. 12, 2011

(54) MINI ENVIRONMENT APPARATUS, INSPECTION APPARATUS, MANUFACTURING APPARATUS AND CLEANING METHOD OF SPACE

(75) Inventors: Takahiro Jingu, Takasaki (JP); Yusuke Miyazaki, Hitachinaka (JP); Kazuhiro Zama, Mito (JP)

(73) Assignee: Hitachi High-Technologies Corporation, Tokyo (JP)

( * ) Notice: Subject to any disclaimer, the term of this patent is extended or adjusted under 35 U.S.C. 154(b) by 324 days.

(21) Appl. No.: 11/882,063

(22) Filed: Jul. 30, 2007

(65) Prior Publication Data
US 2008/0046133 A1 Feb. 21, 2008

(30) Foreign Application Priority Data

Jul. 31, 2006 (JP) ................................ 2006-207774

(51) Int. Cl.
*B01L 1/04* (2006.01)
*G05D 16/00* (2006.01)
(52) U.S. Cl. ........................................ 700/301; 454/187
(58) Field of Classification Search .......... 700/275–277, 700/282, 301; 96/397, 400, 402, 403, 417, 96/421; 95/1, 19, 20; 438/905, 909; 454/187–193, 454/237–239, 254–256, 339–341
See application file for complete search history.

(56) References Cited

U.S. PATENT DOCUMENTS

| | | | | |
|---|---|---|---|---|
| 4,963,069 A | * | 10/1990 | Wurst et al. | 414/416.01 |
| 5,096,477 A | * | 3/1992 | Shinoda et al. | 55/385.2 |
| 5,219,464 A | * | 6/1993 | Yamaga et al. | 96/402 |
| 5,259,812 A | * | 11/1993 | Kleinsek | 454/57 |
| 5,316,518 A | * | 5/1994 | Challenger | 454/187 |
| 5,549,512 A | * | 8/1996 | Sinclair et al. | 454/58 |
| 5,730,777 A | * | 3/1998 | Petersen et al. | 95/12 |
| 5,752,985 A | * | 5/1998 | Nagafune et al. | 29/25.01 |
| 5,951,394 A | * | 9/1999 | Pariseau | 454/61 |
| 5,997,399 A | * | 12/1999 | Szatmary | 454/187 |
| 6,080,060 A | * | 6/2000 | Larsson | 454/187 |
| 6,224,679 B1 | * | 5/2001 | Sasaki et al. | 118/719 |
| 6,368,208 B1 | * | 4/2002 | Minoshima | 454/187 |
| 6,473,668 B2 | * | 10/2002 | Abuzeid et al. | 700/121 |
| 6,616,526 B2 | * | 9/2003 | Matsuura et al. | 454/187 |
| 6,755,734 B2 | * | 6/2004 | Yokoyama et al. | 454/187 |
| 6,797,029 B2 | * | 9/2004 | Lederer et al. | 55/385.2 |

(Continued)

FOREIGN PATENT DOCUMENTS

JP 63046328 A * 2/1988

(Continued)

*Primary Examiner* — M. N. Von Buhr
(74) *Attorney, Agent, or Firm* — Crowell & Moring LLP

(57) ABSTRACT

An outer dust collecting filter covers a casing an intake port and an outer fan flows air from an external environment into the casing via the outer dust collecting filter. A clean chamber has an intake port within the casing, an inner dust collecting filter for covering the intake port, and an inner fan for flowing the air within the casing. A control unit controls fan rotating speeds so that a measured pressure within the casing becomes higher at a set value than a measured pressure in the external environment, and a measured pressure within the clean chamber becomes higher at a set value than the measured pressure within the casing.

1 Claim, 12 Drawing Sheets

U.S. PATENT DOCUMENTS

| | | | |
|---|---|---|---|
| 6,955,595 B2 * | 10/2005 | Kim | 454/187 |
| 7,438,514 B2 * | 10/2008 | Lee et al. | 414/217 |
| 7,465,225 B2 * | 12/2008 | Ohmura et al. | 454/187 |
| 2002/0192057 A1 * | 12/2002 | Meulen | 414/217.1 |
| 2004/0144316 A1 * | 7/2004 | Lee et al. | 118/719 |
| 2004/0146325 A1 * | 7/2004 | Tani et al. | 399/329 |
| 2006/0018736 A1 * | 1/2006 | Lee et al. | 414/217 |
| 2007/0253831 A1 * | 11/2007 | Lee | 417/5 |
| 2008/0076343 A1 * | 3/2008 | Pyers | 454/141 |
| 2008/0139865 A1 * | 6/2008 | Galliher et al. | 588/249 |

FOREIGN PATENT DOCUMENTS

| | | | |
|---|---|---|---|
| JP | 05248677 A | * | 9/1993 |
| JP | 11351626 A | * | 12/1999 |
| JP | 2000002456 A | * | 1/2000 |
| JP | 2009-297953 A | * | 10/2000 |
| JP | 2003017376 A | * | 1/2003 |
| JP | 2004-200669 A | | 7/2004 |
| JP | 2004233037 A | * | 8/2004 |

* cited by examiner

MINI ENVIRONMENT APPARATUS, INSPECTION APPARATUS, MANUFACTURING APPARATUS AND CLEANING METHOD OF SPACE

BACKGROUND OF THE INVENTION

1. Field of the Invention

The present invention relates to a mini environment apparatus intending to clean up a specific space, an inspection apparatus and a manufacturing apparatus using the mini environment apparatus, and a cleaning method of the specific space.

2. Description of the Related Art

For example, in a manufacturing step of a semiconductor, a liquid crystal, a hard disc or the like, if a lot of dusts exist in a working environment, the dust is attached to goods in process and a reduction of a yield ratio is caused. Accordingly, in order to avoid the attachment of the dusts to the goods in process as much as possible, there has been conventionally employed a mini environment structure obtained by arranging a device operating under an atmospheric environment in an inspection apparatus and a manufacturing apparatus used in a manufacturing step in a specific space (hereinafter, described appropriately as a clean chamber), for example, kept at a positive pressure with respect to a circumference by a fan filter unit (hereinafter, described as FFU) or the like (refer to Japanese Patent Application Laid-Open No. 2004-200669 or the like).

SUMMARY OF THE INVENTION

In general, the mini environment structure as mentioned above is constructed within a clean room, and an air itself in an external environment fed into an inner portion of the clean chamber via the FFU is clean to some extent. However, in the conventional mini environment structure, since the air fed from the external environment is only filtered by the filter of the FFU once before being fed to the clean chamber, a cleanliness within the clean chamber depends on a cleanliness of the clean room in the external environment and a filter performance of the FFU. Accordingly, in the case that the cleanliness of the clean room is lowered due to some disturbance or the like, there is no guarantee that it is possible to keep the cleanliness within the clean chamber sufficient due to the influence.

The present invention is made by taking the matter mentioned above into consideration, and an object of the present invention is to provide a mini environment apparatus, an inspection apparatus, a manufacturing apparatus and a cleaning method of a space which can suppress an influence of a cleanliness of an external environment and can keep a target cleanliness of a specific space.

In order to achieve the object mentioned above, in accordance with the present invention, there is provided a mini environment apparatus mounting an inspection apparatus and a manufacturing apparatus thereon, wherein a clean chamber in which a cleanliness of an internal space is required is provided within a casing in which an internal space is kept at a positive pressure with respect to a circumference by a fan filter unit, a fan filter unit is independently provided in the clean chamber so as to feed an air within the casing to the clean chamber, thereby keeping an inner side of the clean chamber at a more positive pressure with respect to the space within the casing.

In accordance with the present invention, it is possible to suppress the influence of the cleanliness of the external environment so as to keep a target cleanliness of the specific space.

A description will be given below of an embodiment in accordance with the present invention with reference to the accompanying drawings.

A mini environment apparatus in accordance with the present invention is structured so as to intend to clean a specific space (a clean chamber), and is employed, for example, in a mini environment structure of an inspection apparatus and a manufacturing apparatus used in a manufacturing step of a semiconductor, a liquid crystal, a hard disc or the like.

DESCRIPTION OF THE PREFERRED EMBODIMENTS

Figure 1:
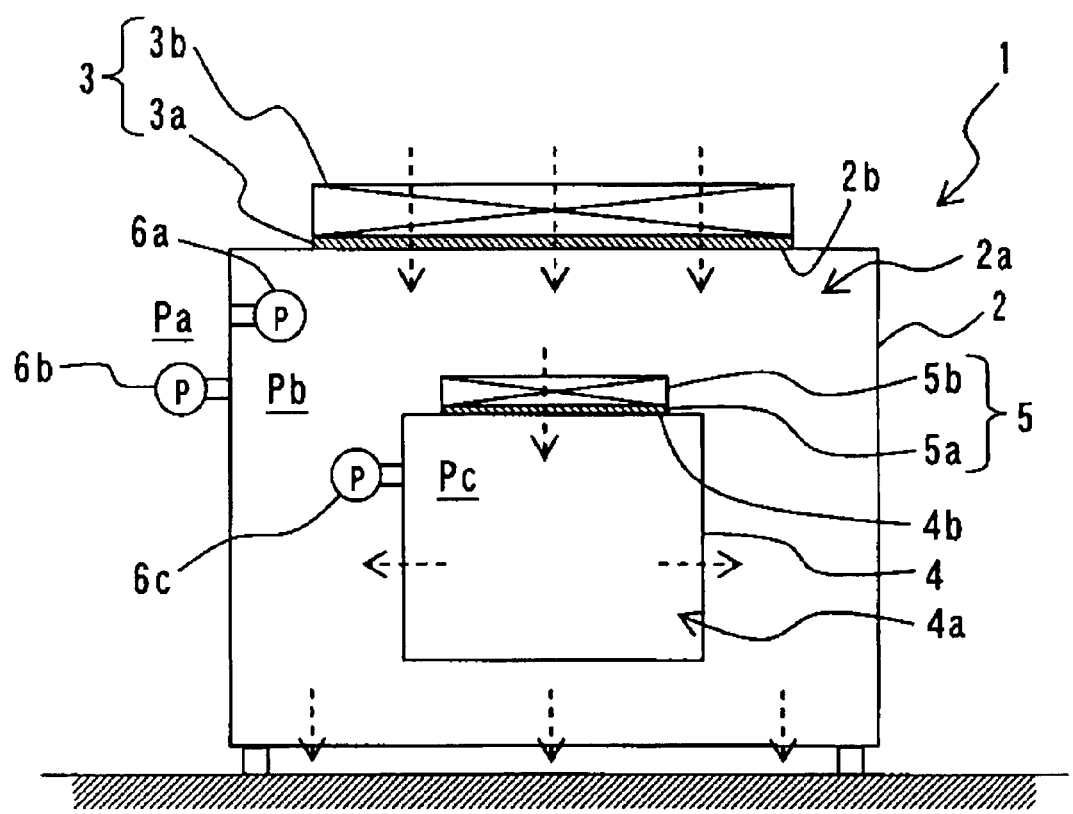
FIG. 1 is a conceptual view of a mini environment apparatus in accordance with an embodiment of the present invention.

FIG. 1 is a conceptual view of a mini environment apparatus in accordance with an embodiment of the present invention. A dotted arrow in the drawing exemplifies an air flow.

A mini environment apparatus 1 shown in FIG. 1 is provided with a casing 2, an outer FFU 3 attached to the casing 2, a clean chamber 4a arranged within the casing 2, an inner FFU 5 provided in the clean chamber 4a, a plurality of pressure measuring units constituted by pressure gauges 6a to 6c measuring pressures in respective portions, and a control apparatus 7 (refer to FIG. 2) controlling the FFU 3 and 5 on the basis of results of detection of the pressure gauges 6a to 6c.

The casing 2 forms an outermost shell of the mini environment structure, and is mounted on a floor surface in an installed plate via a support unit such as an adjuster, a stand or the like (or directly). It is preferable that the installed place of the casing 2 is constituted by a space which is as clean as possible such as a clean room or the like, however, the installed place is not limited to this but the casing 2 can be installed within a normal chamber.

Further, a wall surface of the casing 2 is provided as an air inflow port for setting an internal space to a positive pressure with respect to an external environment (a circumferential space of the casing 2) with an intake port 2b in at least one position. The position at which the intake port 2b is provided may be set to any wall surface of the casing 2, however, is more preferably set to a ceiling surface of the casing 2. The outer FFU 3 mentioned above is attached to the intake port 2b.

The outer FFU 3 is structured by forming an outer dust collecting filter 3a and an outer fan 3b to one unit. It is preferable that the outer dust collecting filter 3a employs a high-performance air filter, for example, an ultra low penetration air filter (an ULPA filter), a high efficiency particulate air filter (an HEPA filter) or the like, and the outer dust collecting filter 3a covers the intake port 2b with no gap and removes the dusts from the air in the external environment fed into the casing 2 from the intake port 2b. The external fan 3b induces an air flow for setting an inner side of the casing 2 to a positive pressure with respect to the external environment, and positively feeds the air in the external environment into the casing 3 via the outer dust collecting filter 3a. At this time, if necessary, the structure may be made such that an exhaust port is provided in the casing 2 in a range in which a displacement becomes smaller than the intake amount.

In accordance with the structure mentioned above, even if the casing 2 has a position in which a complete airtightness is not kept in addition to the intake port 2b, the casing 2 is prevented the dusts from making an intrusion from the external environment by setting the internal space to the positive pressure with respect to the external environment. As mentioned above, the internal space of the casing 2 is set to a clean space with respect to the external environment, and it is possible to keep a sufficient cleanliness for installing a device requiring a clean working environment, for example, an atmospheric air carrier apparatus of a semiconductor inspection apparatus or the like.

On the contrary, the clean chamber 4a is a space in which a highest cleanliness is required in the space under the atmospheric environment within the mini environment apparatus 1, and is a space in which cleanliness is higher than the internal space of the casing 2. As mentioned above, the internal space of the casing 2 is a space in which the cleanliness is sufficiently increased with respect to the external environment, however, is called as a semi-clean chamber 2a for convenience of explanation in relation to the cleanliness of the clean chamber 4a herein.

The clean chamber 4a is installed on a floor surface of the casing 2 via some structure, for example, a stand or the like. Further, a wall surface 4 of the clean chamber 4a is provided with an intake port 4b in at least one position as an air inflow port for setting the clean chamber 4a to the positive pressure with respect to the semi-clean chamber 2a. The intake port 4b faces to an internal space (the semi-clean chamber 2a) of the casing 2. The intake port 4b may be provided on any wall surface 4 of the clean chamber 4a, however, is more preferably provided on the wall surface 4 in an upper portion side of the clean chamber 4a. The inner FFU 5 mentioned above is attached to the intake port 4b.

It is sufficient that the inner FFU 5 has the same structure as the outer FFU 3, and the inner FFU 5 is structured by forming an inner dust collecting filter 5a and an inner fan 5b as one unit. The inner dust collecting filter 5a preferably employs an air filter such as the ULPA filter, the HEPA filter or the like, covers the intake port 4b with no gap and removes the dusts from the air of the semi-clean chamber 2a fed into the clean chamber 4a from the intake port 4b. The inner fan 5b is structured so as to induce an air flow for setting an inner side of the clean chamber 4a to a positive pressure with respect to the semi-clean chamber 2a, and positively feeds the air within the semi-clean chamber 2a into the clean chamber 4a via the inner dust collecting filter 5a. At this time, if necessary, the structure may be made such that an exhaust port is provided on the wall surface 4 of the clean chamber 4a so that the exhaust amount becomes smaller than the intake amount.

In accordance with the structure mentioned above, the clean chamber 4a is prevented the dusts from making an intrusion from the semi-clean chamber 2a, by setting the clean chamber 4a to the positive pressure with respect to the semi-clean chamber 2a even at a position where a complete airtightness is not kept in addition to the intake port 4b. As mentioned above, in the clean chamber 4a, a higher cleanliness is kept than the semi-clean chamber 2a.

In the pressure gauges 6a to 6c mentioned above, an external pressure gauge 6a (an external pressure measuring unit) is structured so as to measure a pressure in an external environment (a circumferential space) of the casing 2. Its mounting position is not particularly limited as far as it is possible to measure the pressure around the casing 2, however, the external pressure gauge 6a is attached to a side wall surface of the casing 2 in the present embodiment. An internal pressure gauge 6b (an internal pressure measuring unit) is structured so as to measure a pressure in the semi-clean chamber 2a within the casing 2, and its mounting position is not particularly limited, however, the internal pressure gauge 6b is attached to the side wall surface of the casing 2. Further, a clean chamber pressure gauge 6c (a clean chamber pressure measuring unit) is structured so as to measure a pressure within the clean chamber 4, and its mounting position is not particularly limited in the same manner, however, the clean chamber pressure gauge 6c is attached to the wall surface 4 of the clean chamber 4a in the present embodiment.

Figure 2:
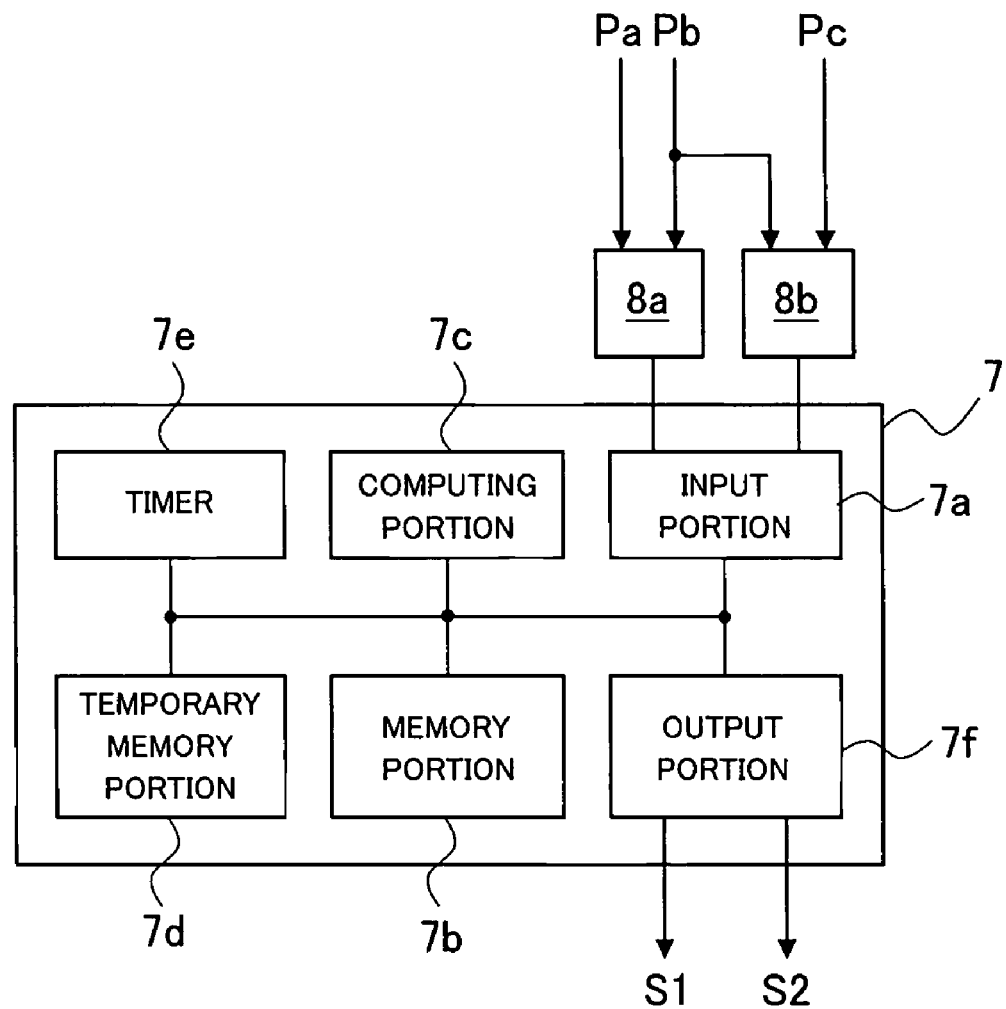
FIG. 2 is a block diagram picking up a main portion of a control apparatus.

The pressure gauges 6a to 6c are connected to the control apparatus 7 via differential pressure gauges 8a and 8b (refer to FIG. 2). The differential pressure gauge 8a measures a differential pressure ΔP1 obtained by subtracting a measured pressure Pa in the external environment of the casing 2 measured by the external pressure gauge 6a from a measured pressure Pb within the semi-clean chamber 2a measured by the internal pressure gauge 6b. The differential pressure gauge 8b measures a differential pressure ΔP2 obtained by subtracting the measured pressure Pb within the semi-clean chamber 2a measured by the internal pressure gauge 6b from a measured pressure Pc within the clean chamber 4a measured by the clean chamber internal pressure gauge 6c.

FIG. 2 is a block diagram picking out a main portion of the control apparatus 7.

In FIG. 2, the control apparatus 7 is provided with an input portion 7a appropriately changing a signal to a digital signal so as to input, a memory portion 7b previously storing a constant, a program and the like necessary for the control, a computing portion 7c executing various computing processes in accordance with the program, the constant and the like on the basis of the input signal, a temporary memory portion 7d temporarily storing a computation result and a value in process of the computation, a timer 7e measuring time, and an output portion 7f appropriately changing the computed command signal to an analogue signal so as to output to a corresponding device. The control apparatus may be accommodated within the casing 2 or may be installed in an outer side of the casing 2.

Figure 3:
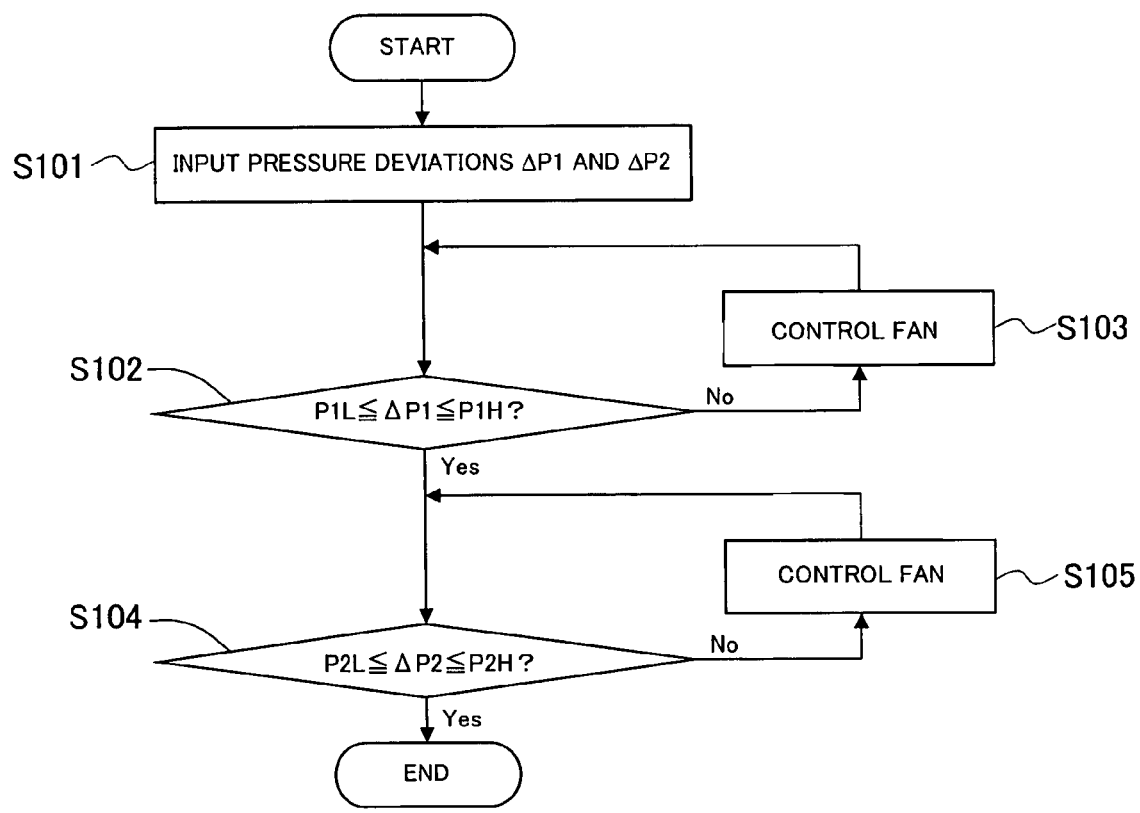
FIG. 3 is a flowchart showing a rotating speed control procedure of a fan of the control apparatus.

FIG. 3 is a flowchart showing a rotating speed control procedure of the fan of the control apparatus 7.

As shown in FIG. 3, if the differential pressures $\Delta P1$ and $\Delta P2$ are input to the control apparatus 7 from the differential pressure gauges 8a and 8b in a step 101, the control apparatus 7 stores the input values in the temporary memory portion 7d.

A subsequent step 102 determines whether or not the value $\Delta P1$ is in a proper range by reading the value $\Delta P1$ from the temporary memory portion 7d. An upper limit value P1H (>0) and a lower limit value P1L (>0) of the proper range are stored in the memory portion 7b, and the computing portion 7c compares the set values P1H and P1L read from the memory portion 7b with the value $\Delta P1$ so as to determine whether or not the semi-clean chamber 2a is kept in a state which is close to the positive pressure at the set pressure with respect to the external environment.

In the case that the value $\Delta P1$ does not exist in the proper range and the determination of the step 102 is not satisfied, the computing portion 7c transfers a procedure to a step 103, computes a command signal on the basis of the current $\Delta P1$ so as to restore the value $\Delta P1$ to the proper range, and outputs the command signal to the fan control unit so as to control a rotating speed of the fan. For example, in the case that the value $\Delta P1$ is smaller than the lower limit value P1L of the proper range, the control unit increases the rotating speed of the outer fan 3b, and in the case that the value $\Delta P1$ is larger than the upper limit value P1H of the proper range, the control unit reduces the rotating speed of the outer fan 3b. There can be considered to reduce the rotating speed of the inner fan 5b in the condition of the value $\Delta P1<P1L$, and increase the rotating speed of the inner fan 5b in the condition of the value $\Delta P1>P1H$, and it is possible to execute a complex control of the fans 3b and 5b.

If the value $\Delta P1$ exists within the proper range and the determination of the step 102 is satisfied, the procedure is transferred to a step 104, and the step 104 determines whether or not the value $\Delta P2$ read from the temporary memory portion 7d exists within a proper range. An upper limit value P2H (>0) and a lower limit value P2L (>0) of the proper range are stored in the memory portion 7b, and the computing portion 7c compares the set values P2H and P2L read from the memory portion 7b with the value $\Delta P2$ so as to determine whether or not the clean chamber 4a is kept in the state close to the positive pressure at the set pressure with respect to the semi-clean chamber 2a.

In the case that the value $\Delta P2$ does not exist in the proper range and the determination of the step 104 is not satisfied, the computing portion 7c transfers the procedure to a step 105, computes the command signal on the basis of the current $\Delta P2$ so as to restore the value $\Delta P2$ to the proper range and outputs the command signal to the fan control unit so as to control the rotating speed of the fan. For example, the rotating speed of the inner fan 5b is increased in the case that the value $\Delta P2$ is smaller than the lower limit value P2L of the proper range, and the rotating speed of the inner fan 5b is reduced in the case that the value $\Delta P2$ is larger than the upper limit value P2H of the proper range.

If the value $\Delta P2$ exists within the proper range and the determination of the step 104 is satisfied, the control apparatus 7 finishes the procedure in FIG. 3. Further, the control apparatus 7 always keeps the values $\Delta P1$ and $\Delta P2$ in a previously set proper range, by repeatedly executing the series of control procedures.

As mentioned above, in the present embodiment, the structure is made such that the clean chamber 4a in which the higher cleanliness is required is provided within the semi-clean chamber 2a which is kept at the positive pressure with respect to the external environment by the outer FFU 3, and the FFU 5 is provided independently in the clean chamber 4a so as to feed the cleaned air within the semi-clean chamber 2a to the clean chamber 4a, thereby keeping the inner side of the clean chamber 4a at the more positive pressure with respect to the semi-clean chamber 2a. In other words, the structure is made such that the air for setting the clean chamber 4a to the positive pressure is sucked from the semi-clean chamber 2a which is cleaned with respect to the external environment, and the air passes through the double dust collecting filters before being fed into the clean chamber 4a from the external environment.

For example, in the case that the ULPA filter having a particle collection efficiency equal to or more than 99.9995% with respect to a particle having a grain diameter of 0.15 μm for a rated air volume rate is used for the dust collecting filters 3a and 5a, the dust per a unit volume within the semi-clean chamber 2a is equal to or less than 0.0005% with respect to that of the external environment by driving the fans 3b and 5b so as to achieve the rated air volume rate. The dust per a unit volume within the clean chamber 4a is equal to or less than 0.0005% with respect to that of the semi-clean chamber, that is, equal to or less than 0.00000025% with respect to that of the external environment. In this case, even if 99.9995% of dusts are removed due to some disturbance, the cleanliness of the air in the external environment may be lowered to such a degree that the cleanliness of the semi-clean chamber 2a is insufficient for the target working environment, however, an influence which the cleanliness of the external environment applies to the cleanliness of the clean chamber 4a is as close to zero as possible. As mentioned above, in accordance with the present embodiment, it is possible to suppress the influence of the cleanliness of the external environment and it is possible to keep the target cleanliness of the specific space.

In this case, in the present embodiment, the description is given by exemplifying the structure in which two fans 3b and 5b are controlled by one control apparatus 7, however, the structure may be made such that a plurality of control apparatuses are provided for respectively controlling the fans 3b and 5b. For example, the structure may be made such that a first control apparatus is provided for controlling the rotating speed of the outer fan 3b in such a manner that the value $\Delta P1$ comes to the proper range, and a second control apparatus is provided for controlling the rotating speed of the inner fan 5b in such a manner that the value $\Delta P2$ comes to the proper range.

Further, the upper limit value P1H for setting the pressure of the clean chamber 2a is set in correspondence to a specification or the like of the dust collecting filter 3a, and corresponds to a value which is previously considered so as to prevent an intrusion of the dust from the intake port 2b, a consumption of the dust collecting filter 3a and an increase of an energy consumption caused by the driving of the fan 3b from becoming more than necessary. The lower limit value P1L is a sufficient value to suppress the intrusion of the dust from the external environment. For example, about 1 to 2 Pa is a rough standard of the values P1L and P1H. The value P1H may be set to a value higher than the value P1L, or may be considered to be set to the same value as the value P1L. Further, the same matter can be applied to the values P2L and P2H as the values P1L and P1H, and the value P2L may be set to the same value as or the different value from the value P1L. The same matter is applied to the values P2H and P1H.

In this case, the mini environment apparatus in accordance with the present invention is not limited to the structure shown in FIG. 1, but can be variously modified within the scope of the technical idea. In other words, various modified embodiments can be considered within the range of the structure for feeding the air already cleaned by passing through the dust collecting filter to the clean chamber requiring the highest cleanliness in the space placed under the atmospheric environment further via the dust collecting filter.

Some typical modified embodiments will be exemplified as follows.

First Modified Embodiment

Figure 4:
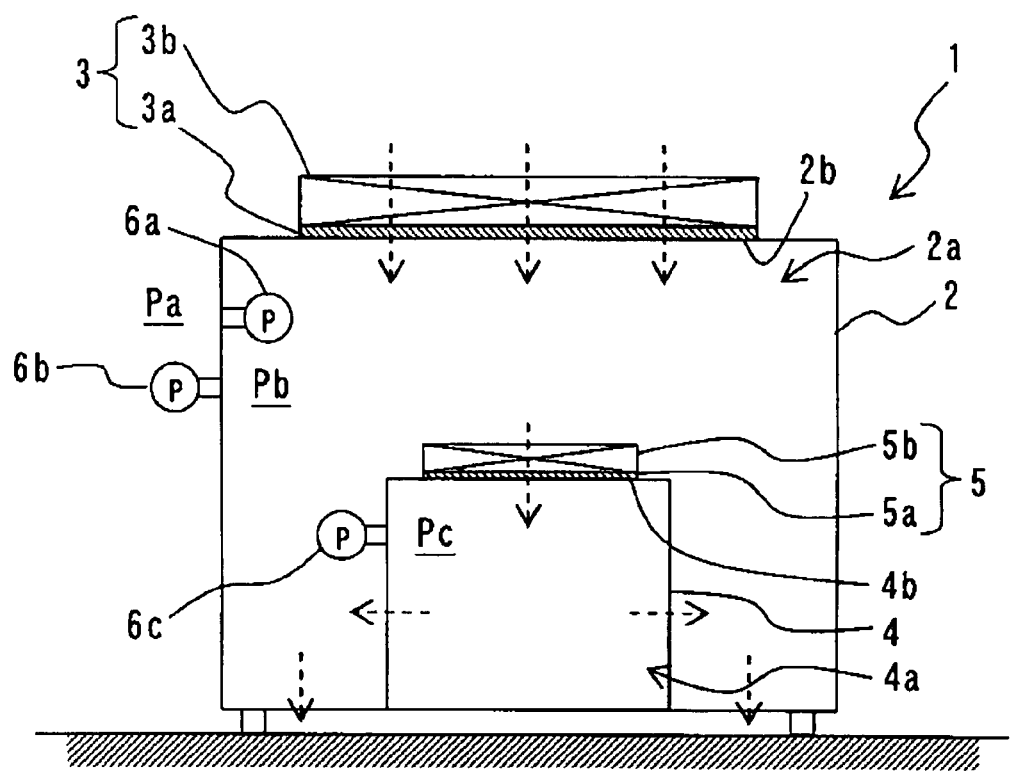
FIG. 4 is a conceptual view of a mini environment apparatus in accordance with a first modified embodiment of the present invention.

FIG. 4 is a conceptual view of a mini environment apparatus 1A in accordance with a first modified embodiment of the present invention. The same reference numerals are attached to the same parts or the portions having the same functions as those of FIG. 1, and a description thereof will not be described.

In FIG. 1, the description is given by exemplifying the case that the clean chamber 4a is completely surrounded by the semi-clean chamber 2a, however, it is sufficient that at least the intake port 4b of the clean chamber 4a faces to the semi-clean chamber 2a as far as the inner side of the clean chamber 4a is kept at the positive pressure with respect to the circumference. Accordingly, the clean chamber 4a may be arranged in such a manner as to come into contact with the floor surface of the casing 2 as shown in FIG. 4. In this case, the clean chamber 4a may be structured as a space defined by a wall surface 4 which is structured as a box shape independently from the casing 2, or may be structured as a space formed by comparting the space (the semi-clean chamber 2a) within the casing 2 by a partition wall 4. The latter is structured such that the floor surface of the clean chamber 4a doubles as the floor surface of the semi-clean chamber 2a, and the lower portion side of the clean chamber 4a is isolated only by the floor surface of the casing 2. The other structures are the same as FIG. 1.

Even in the layout of the clean chamber 4a mentioned above, since the clean chamber 4a is arranged within the semi-clean chamber 2a, it is possible to feed the air within the semi-clean chamber 2a to the clean chamber 4a via the inner FFU 5. Accordingly, it is possible to obtain the same effect as the embodiment described in FIGS. 1 to 3 by controlling the FFU 3 and 5 on the basis of the measured pressures in the respective positions from the pressure gauges 6a to 6c so as to set the clean chamber 4a to the positive pressure with respect to the periphery.

Second Modified Embodiment

Figure 5:
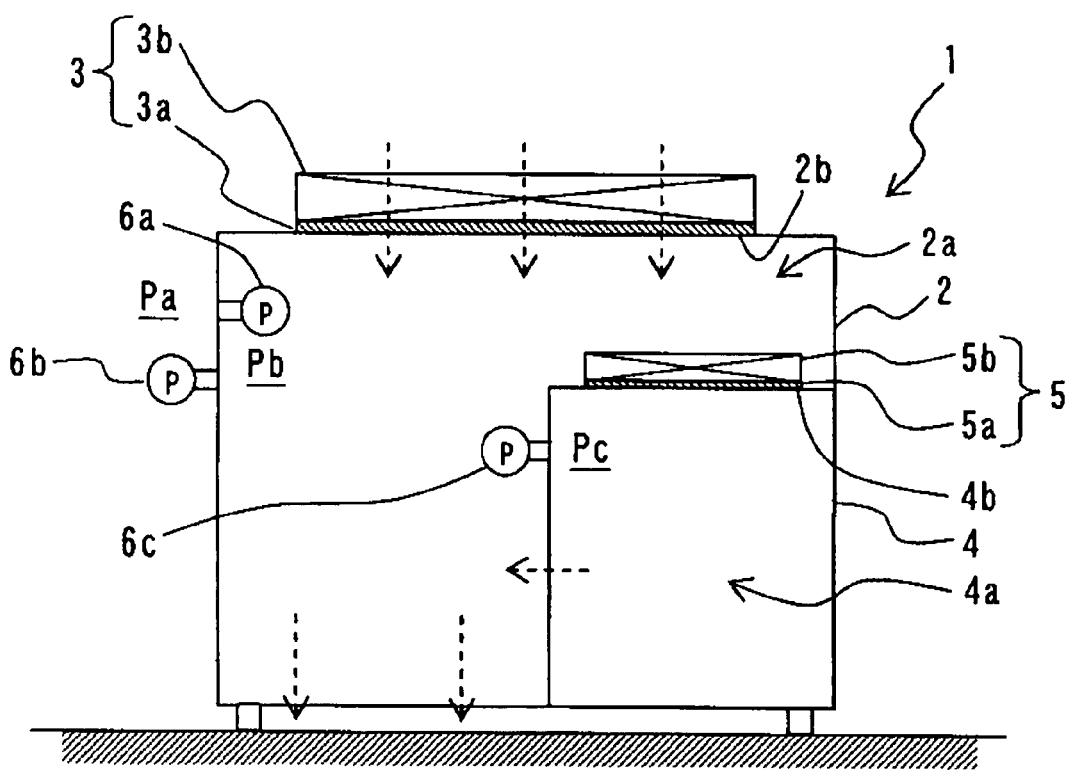
FIG. 5 is a conceptual view of a mini environment apparatus in accordance with a second modified embodiment of the present invention.

FIG. 5 is a conceptual view of a mini environment apparatus 1B in accordance with a second modified embodiment of the present invention. The same reference numerals are attached to the same parts or the portions having the same functions as those of FIG. 1, and a description thereof will not be described.

The present embodiment corresponds to a structure embodiment in which the clean chamber 4a is not completely surrounded by the semi-clean chamber 2a. In the present embodiment, in addition to the floor surface of the clean chamber 4a, one or a plurality of surfaces in side surfaces heading for a horizontal direction is isolated from the external environment by the wall surface of the casing 2. The other structures are the same as FIG. 1.

Even in the layout of the clean chamber 4a mentioned above, it is possible to obtain the same effect as the embodiment described in FIGS. 1 to 3 by setting the clean chamber 4a to the positive pressure with respect to the periphery.

Third Modified Embodiment

Figure 6:
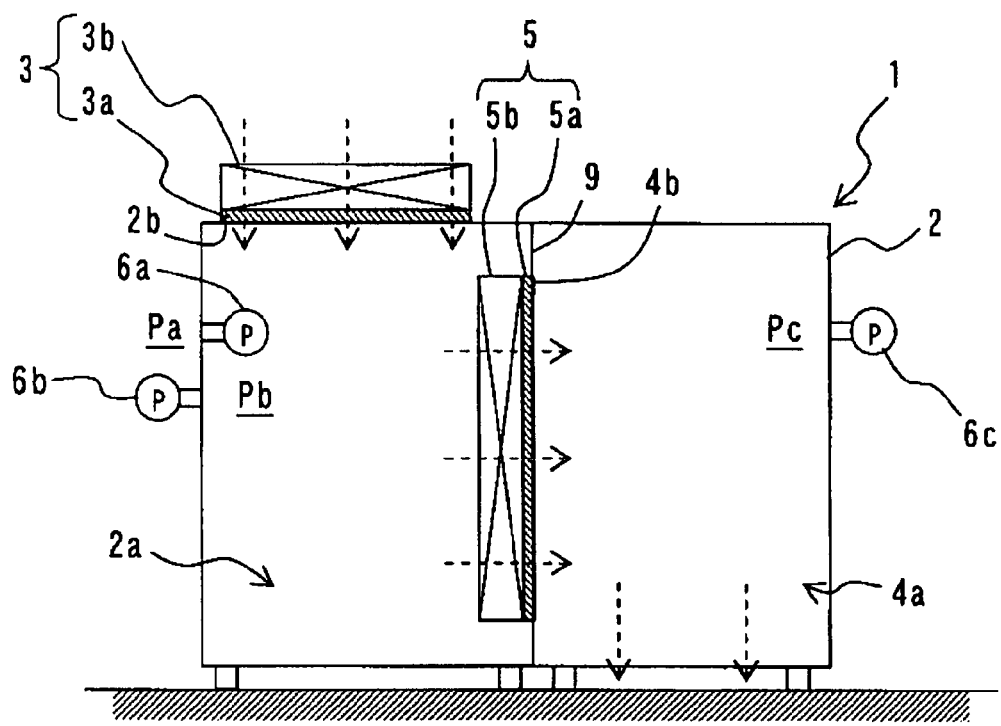
FIG. 6 is a conceptual view of a mini environment apparatus in accordance with a third modified embodiment of the present invention.

FIG. 6 is a conceptual view of a mini environment apparatus 1C in accordance with a third modified embodiment of the present invention. The same reference numerals are attached to the same parts or the portions having the same functions as those of FIG. 1, and a description thereof will not be described.

In order to structure such that at least the intake port 4b of the clean chamber 4a faces to the semi-clean chamber 2a, in addition to the structure in which the clean chamber 4a is arranged within the semi-clean chamber 2a, there can be considered a structure in which the space within the casing 2 is divided into the clean chamber 4a and the semi-clean chamber 2a by a partition wall 9 such as the present embodiment. The partition wall 9 is provided with the intake port 4b and the inner FFU 5 for covering the intake port 4b, and is structured such that the air in the adjacent semi-clean chamber 2a is fed to the clean chamber 4a. Of course, a wall surface separated in the semi-clean chamber 2a of the casing 2 is provided with the outer FFU 3 for cleaning the air from the external environment to feed it to the semi-clean chamber 2a.

Even in the layout mentioned above, since the clean air within the semi-clean chamber 2a is fed to the intake port 4b of the clean chamber 4a, it is possible to obtain the same effect as the embodiment described in FIGS. 1 to 3 by setting the clean chamber 4a to the positive pressure with respect to the periphery.

In this case, in the present embodiment, the internal space of one casing 2 is divided into two parts by the partition wall 9, however, may be separated into three or more spaces. Further, there can be considered a structure in which the air is fed to the casing constructed as the clean chamber from the adjacent casing constructed as the semi-clean chamber via the FFU.

Fourth Modified Embodiment

Figure 7:
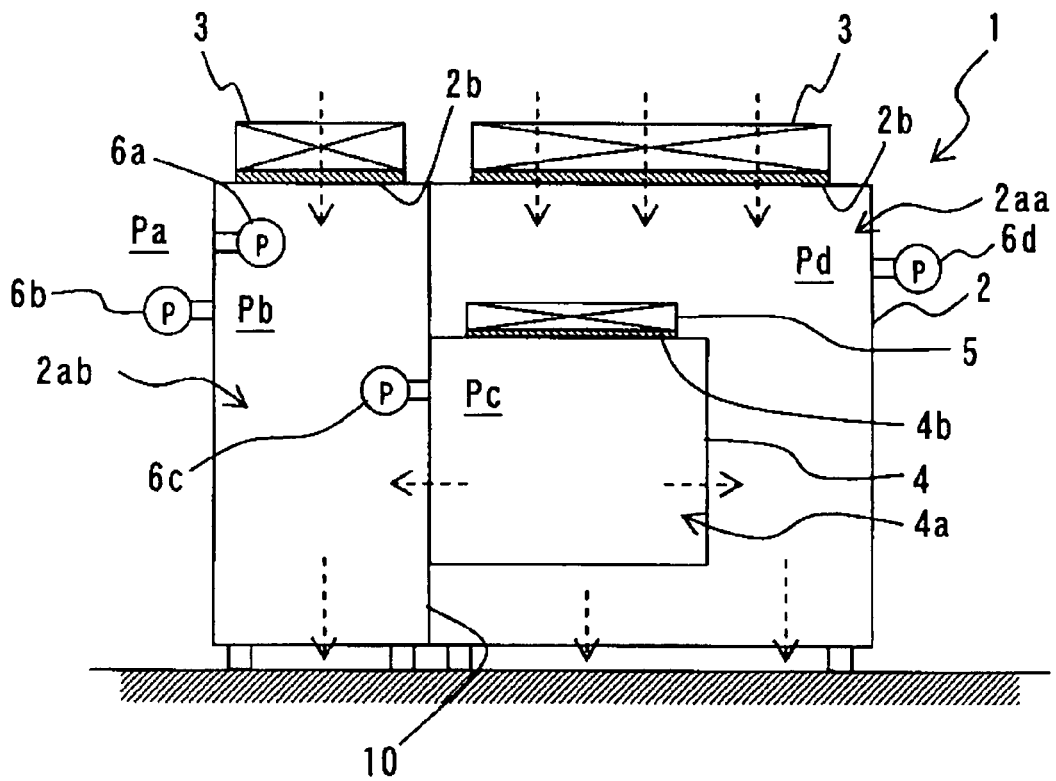
FIG. 7 is a conceptual view of a mini environment apparatus in accordance with a fourth modified embodiment of the present invention.

FIG. 7 is a conceptual view of a mini environment apparatus 1D in accordance with a fourth modified embodiment of the present invention. The same reference numerals are attached to the same parts or the portions having the same functions as those of FIG. 1, and a description thereof will not be described.

Each of the embodiments mentioned above is exemplified by the structure in which the surface provided with at least the intake port of the clean chamber 4a is covered by one semi-clean chamber 2a, however, the surface may be covered by a plurality of semi-clean chambers 2aa and 2ab (two semi-clean chambers in the present embodiment, however, may be covered by three or more semi-clean chambers) as shown in FIG. 7. In this case, it is not necessary to define a priority in pressure between the adjacent semi-clean chambers 2aa and 2ab, but in the case that an airtightness between the semi-clean chambers 2aa and 2ab is complete and an air flow is not generated between both the chambers, it is sufficient to set on the basis of the relation between the external environment and the clean chamber 4a, and in the case that the air flow is generated, it is sufficient to set to the same level of pressure. Particularly, in the case that the cleanliness required as the working environment has relative merits between the semi-clean chambers 2aa and 2ab, it is preferable that the semi-clean chamber having the higher required cleanliness is set to the positive pressure with respect to the clean chamber having the lower cleanliness.

Even in the structure mentioned above, since the air within the semi-clean chamber 2a is fed to the clean chamber 4a via the inner FFU 5 in the same manner, it is possible to obtain the same effect as the embodiment described in FIGS. 1 to 3 by controlling the FFU 3 and 5 in the same procedure as FIG. 3 on the basis of the measured pressures in the respective positions from the pressure gauges 6a to 6d so as to set the clean chamber 4a to the positive pressure with respect to the periphery.

In this case, in the case of the present embodiment, the air in the external environment is taken in the inner portion in both of the semi-clean chambers 2aa and 2ab via the outer FFU 3, however, the structure may be made, for example, such that the FFU 3 and the intake port 2b of the semi-clean chamber 2ab are moved to the partition wall 10 between the semi-clean chambers 2aa and 2ab, and the air is fed to the semi-clean chamber 2ab from the adjacent semi-clean chamber 2aa via the FFU. In accordance with this structure, the semi-clean chamber 2ab comes to the positive pressure with respect to the semi-clean chamber 2aa and comes to an environment in which the cleanliness is higher than the semi-clean chamber 2aa. The clean chamber 4a comes to an environment in which the cleanliness is further higher than the semi-clean chamber 2ab.

In each of the embodiments mentioned above, the structure is made such that the FFU is provided in each of the intake ports, however, any one of them or all of them may be structured such that a ventilation duct is connected to the dust collecting filter provided in the intake port. In this case, it is not necessary that the fan of the ventilation duct and the dust collecting filter are united. In other words, the FFU is not necessarily provided in the intake port. Further, an air flow shown by a dotted arrow in each of the embodiments is only an example, and can be variously modified in correspondence to a purpose and a structure of an apparatus to be formed as a mini environment apparatus.

Further, the structure is made such that the measured result of the differential pressure gauge measuring the differential pressure of the measured results of the respective pressure gauges is input to the control apparatus 7, however, the structure may be made such that the measured results of the respective pressure gauges are directly input to the control apparatus 7, and the differential pressure is computed by the control apparatus 7, for example, a computing portion 7c of the control apparatus 7.

Further, a method of cleaning the semi-clean chamber and the clean chamber can employ various methods such as a turbulent flow (conventional) method, a horizontal laminar flow (cross flow) method, a vertical laminar flow (down flow) method and the like. Further, there is employed the structure in which the differential pressure between the adjacent spaces is regulated by the rotating speed of the fan, however, in some cases, in place of the structure in which the differential pressure is regulated in the intake side, there can be considered a structure in which the differential pressure is regulated by setting an exhaust air flow rate regulating unit such as an exhaust port, a damper and the like, and regulating the exhaust air flow rate.

Next, there are exemplified some typical embodiments of various apparatus to which the mini environment apparatus in accordance with the present invention is applied and which is formed as the mini environment structure.

Embodiment 1

Figure 8:
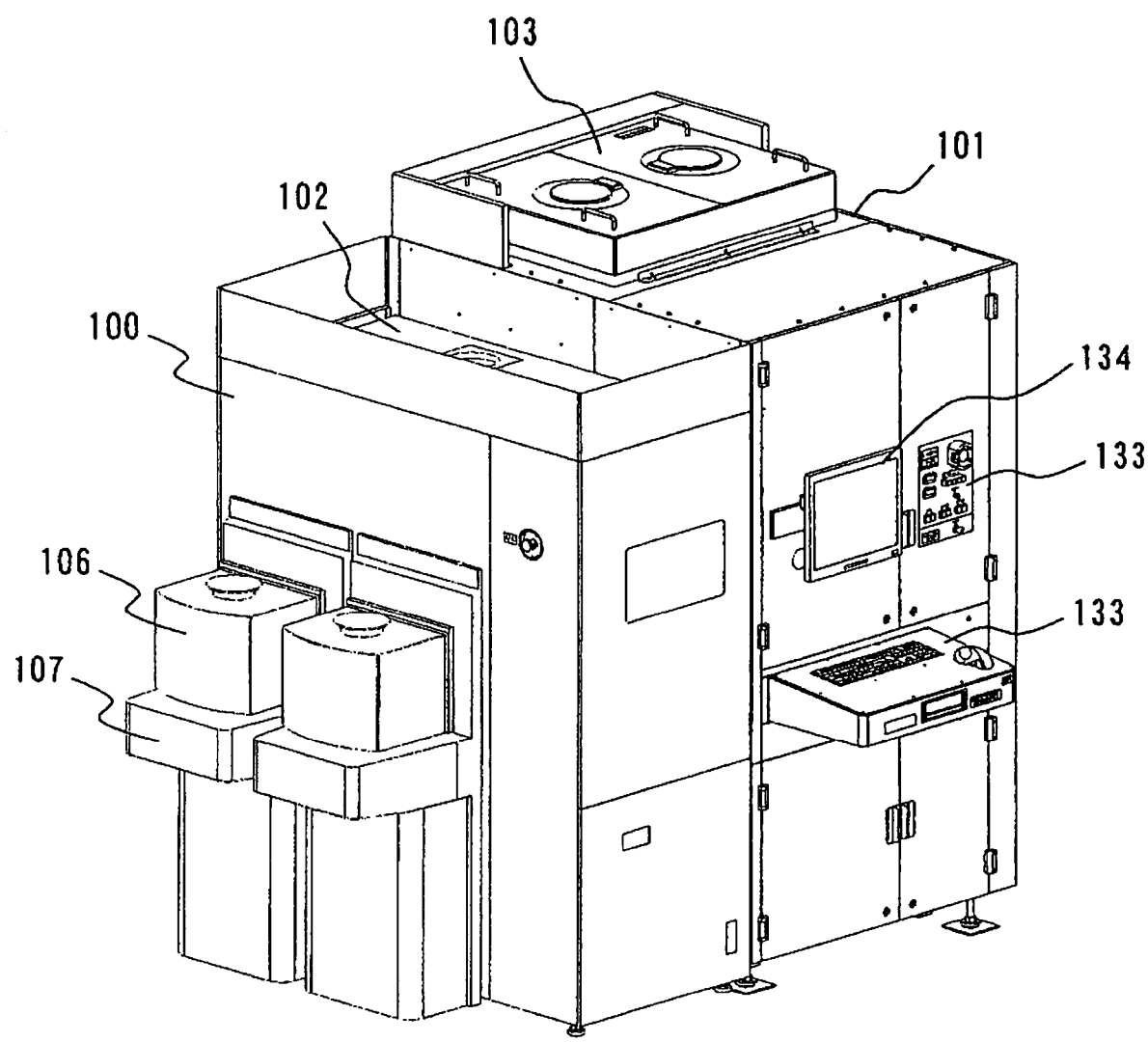
FIG. 8 is an outline view of an optical type outer appearance inspection apparatus to which the mini environment apparatus in accordance with the present invention is applied.

FIG. 8 is an outline view of an optical type outer appearance inspection apparatus to which the mini environment apparatus in accordance with the present invention is applied.

The outer appearance inspection apparatus in accordance with the present embodiment is used, for example, in an outer appearance inspection of a wafer, a liquid crystal, a hard disc or the like, and a mini environment structure is close to the embodiment in FIG. 7 of the respective embodiments shown in FIGS. 1 to 7. Respective intake ports and FFU 102 and 103 for covering them are placed in top plates of two adjacent casings 100 and 101.

Figure 9:
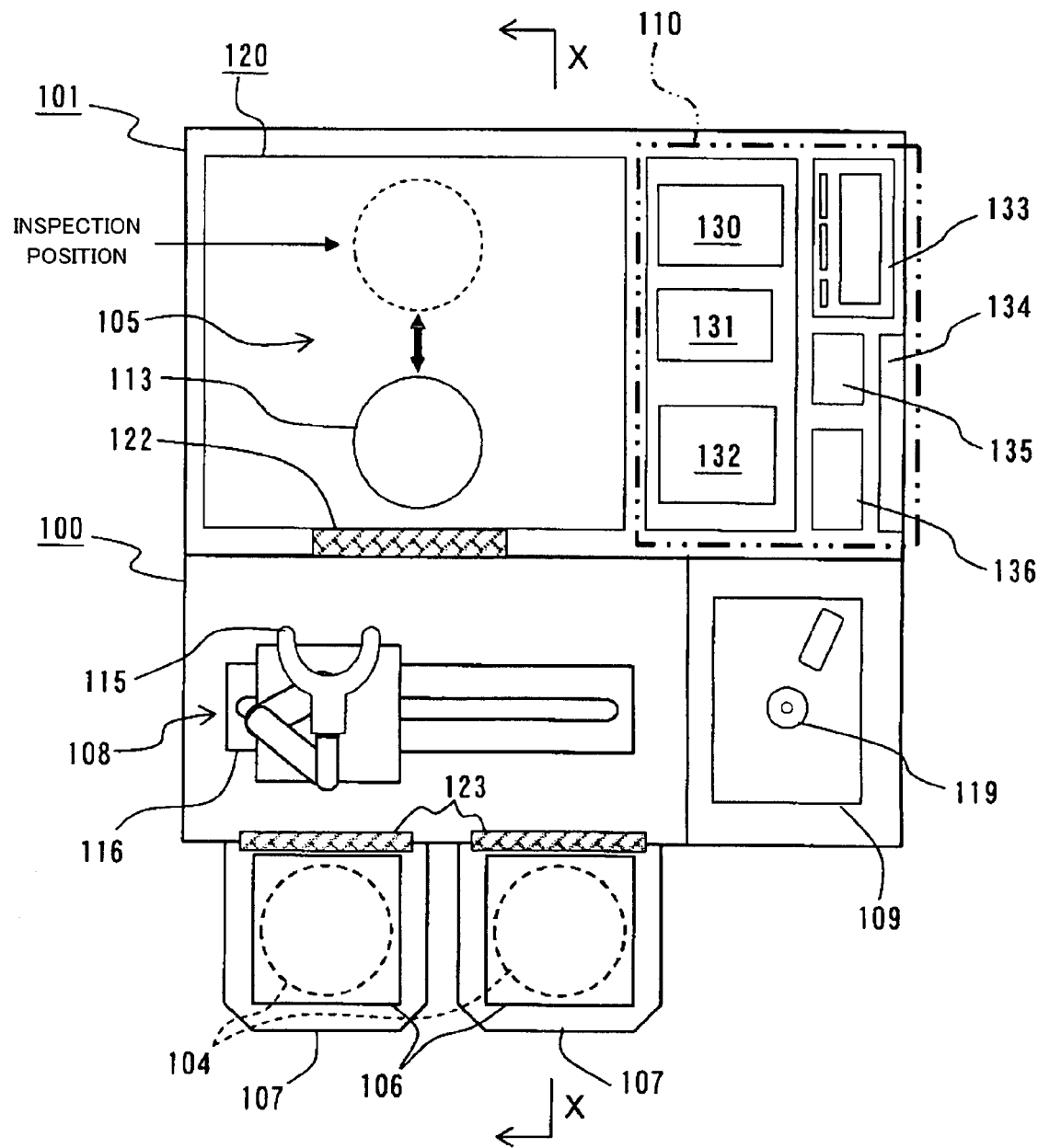
FIG. 9 is a horizontal cross sectional view as seen from a top plate side of the outer appearance inspection apparatus in FIG. 8.
Figure 10:
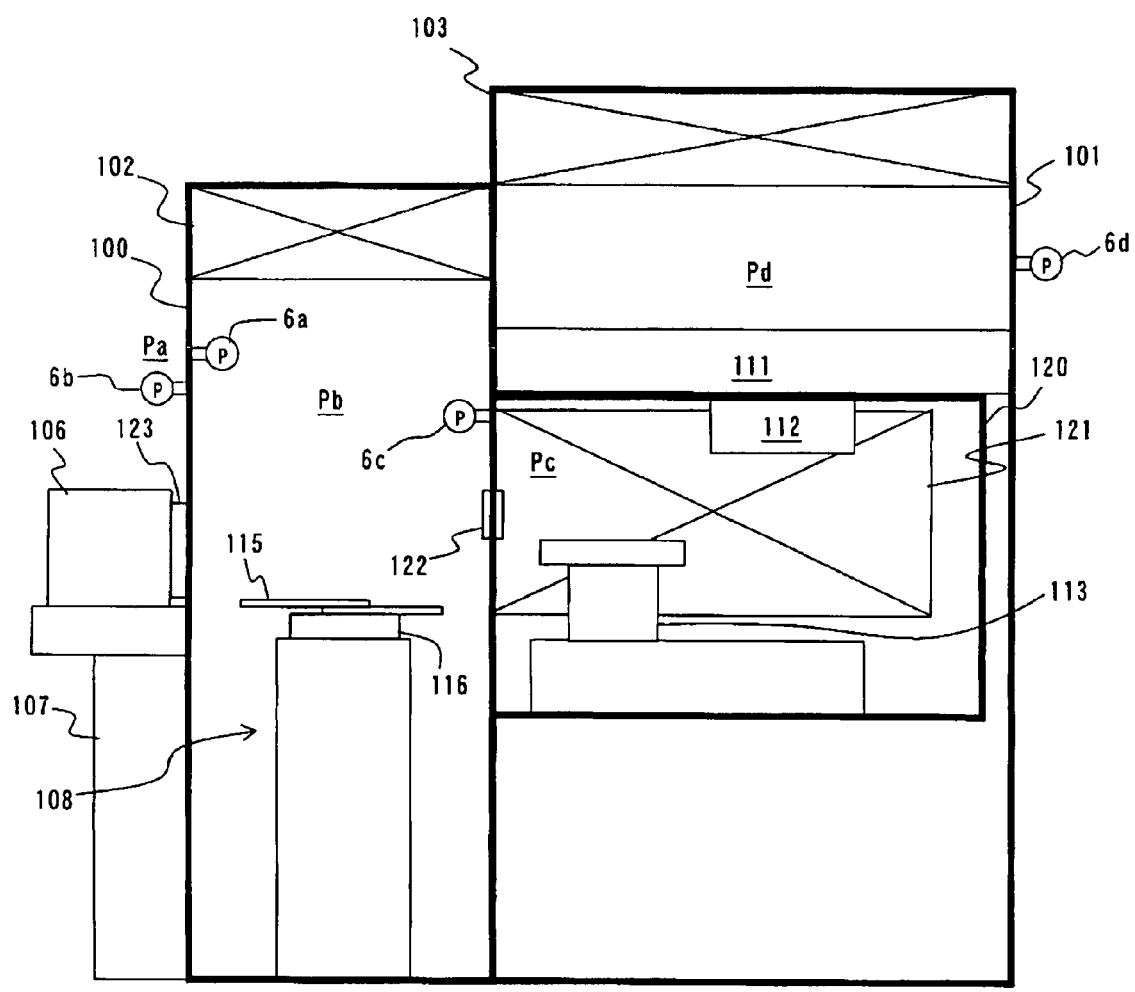
FIG. 10 is a cross sectional view schematically showing a cross section along a line X-X in FIG. 9.

FIG. 9 is a horizontal cross sectional view as seen from a top plate side of the outer appearance inspection apparatus in FIG. 8, and FIG. 10 is a cross sectional view schematically showing a cross section along a line X-X in FIG. 9.

As shown in FIGS. 9 and 10, a casing 120 defining a clean chamber is arranged in an inner portion of the casing 101. A side surface of the casing 120 is provided with an intake port and an FFU 121 for covering the intake port. In other words, an internal space of the casings 100 and 101 to which the air in the external environment is fed via the FFU 102 and 103 corresponds to the "semi-clean chamber" mentioned above, and an internal space of the casing 120 to which the air within the casing 101 is fed via the FFU 121 corresponds to the "clean chamber" mentioned above.

Further, the casing 120 is arranged close to a wall surface side isolating the casings 100 and 101, and is structured so as to communicate with the space within the casing 100 if a shutter 122 is opened. Further, the casing 100 is provided with a gate 123 for taking a wafer 104 in and out the external environment.

The outer appearance inspection apparatus is provided with an optical type inspection apparatus 105 inspecting an outer appearance of a sample 104 (the wafer in the present embodiment), a load port 107 mounting a wafer pot 106 accommodating the water 104 the outer appearance of which is inspected by the optical type inspection apparatus 105, a carrier apparatus 108 feeding the wafer 104 between the load port 107 and the optical type inspection apparatus 105, a pre-alignment portion 109 adjusting a direction of the wafer 104 in a peripheral direction, and a controller 110 controlling or data processing various mounted devices.

The optical type inspection apparatus 105 is provided with an illumination optical system 111, a detection optical system 112, and an inspection stage 113. If the wafer 104 is mounted on the inspection stage 113 by the carrier apparatus 108, the inspection stage 113 is moved to an inspection position, an illumination light is irradiated on the wafer 104 by the illumination optical system 111, and a reflected light or a scattered light from the wafer 104 is detected by the detection optical system 112.

The carrier apparatus 108 is provided with a handling arm 115 taking up the wafer 104 so as to move within a horizontal surface and in a vertical direction, and a moving apparatus 116 sliding the handling arm 115 in a direction of one shaft so as to move.

The controller 110 is provided with an image processing portion 130 processing the inspection data from the detection optical system 112 so as to generate an image data, a memory portion 131 storing various data, a control apparatus 132 controlling various devices, an input apparatus 133 for operating and inputting, a display apparatus 134 displaying various settings, the inspection image and the like, an output apparatus 135, an external memory apparatus 136 and the like.

For example, in the case of feeding the wafer 104 to the optical type inspection apparatus 105 from the wafer pod 106 so as to inspect the outer appearance of the wafer 104, the handling arm 115 is moved to the wafer pod 106 by driving the moving apparatus 116, and the wafer 104 within the wafer pod 106 is taken up by the handling arm 115 by opening the gate 123. As occasion demands, the handling arm 115 is moved toward the pre-alignment portion 109, the wafer 104 is mounted on the mounting portion 119 of the pre-alignment portion 109, and the position in the peripheral direction of the wafer 104 is aligned. After taking up the aligned wafer 104 by the handling arm 115 again, and moving the handling arm 115 to the position of the shutter 122, the shutter 122 is opened, and the wafer 104 is mounted on the inspection stage 113 of the optical type inspection apparatus 105 by the handling arm 115. Further, the wafer 104 is fed to the inspection position executed by the inspection optical system 112 by moving the inspection stage 113, and the outer appearance inspection of the wafer 104 is executed.

In the case that the inspected wafer 104 is returned to the wafer pod 106, a reverse procedure to the procedure mentioned above is executed (the procedure of the pre-alignment is omitted).

In this case, in a time at which the wafer 104 exists within the outer appearance inspection apparatus after being taken out from the wafer pod 106, a time at which the wafer 104 is treated by the optical type inspection apparatus 105 is longer than a time at which the wafer 104 is treated by the carrier apparatus 108. In this sense, it is said that a risk that the dusts are attached to the wafer 104 is higher during the inspection than during the carrier.

Accordingly, in the present embodiment, the carrier apparatus 108, the pre-alignment portion 109 and the like are arranged within the casing 100 in the various devices constituting the outer appearance inspection apparatus, and the optical type inspection apparatus 105 and the like are arranged within the casing 120. In addition, the controller 110 and the like are arranged within the casing 101. Further, in the same manner as the embodiment shown in FIG. 7, the respective space and external environment pressure gauges 6a to 6d are provided at the predetermined positions. The fans of the respective FFU 102, 103 and 121 are controlled by the control apparatus 132 on the basis of the result of measurement of a plurality of pressure measuring units constituted by the pressure gauges 6a to 6d.

Figure 11:
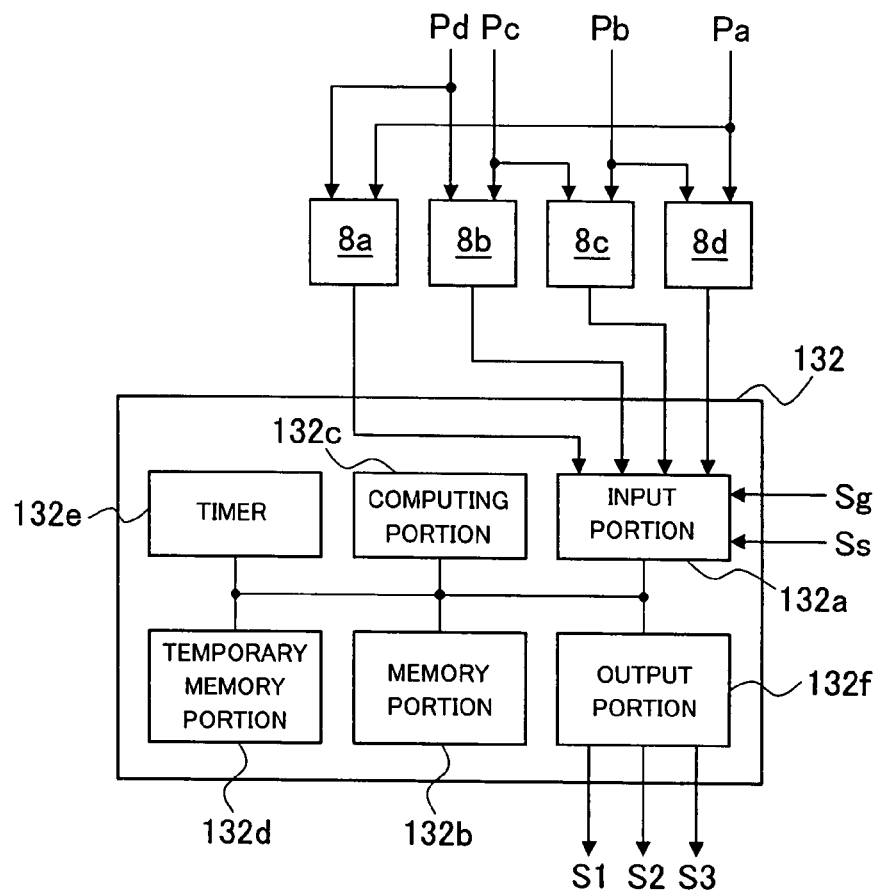
FIG. 11 is a function block diagram picking up a main portion of the control apparatus.

FIG. 11 is a function block diagram picking up a main portion of the control apparatus 132.

In the present embodiment, since the number of the space is larger than the embodiment shown in FIG. 1, the number of the pressure gauges is increased. Accordingly, the number of the differential pressure gauges measuring the differential pressure between the adjacent spaces is increased in correspondence thereto, however, the structure is approximately the same as the control apparatus shown in FIG. 2 except the point. In addition, the present embodiment is structured such that open signals Sg and Ss of the gate 123 and the shutter 122 are input to an input portion 132a. The structure itself of the control apparatus 132 is approximately the same as the control apparatus 7 in FIG. 2, and a description thereof will not be described by replacing reference numerals 7a to 7f of the respective constituting elements of the control apparatus 7 by reference numerals 132a to 132f.

A control procedure of the respective fans of the FFU 102, 103 and 121 controlled by the control apparatus 132 can be set to the same procedure as FIG. 3. In the case of the present embodiment, the following relation exists among the magnitudes of the measured result (the pressure of the external environment) Pa of the pressure gauge 6a (the external pressure measuring unit), the measured result (the pressure of the semi-clean chamber (within the casing 100)) Pb of the pressure gauge 6b (the first internal pressure measuring unit), the measured result (the pressure of the clean chamber (within the casing 120)) Pc of the pressure gauge 6c (the clean chamber pressure measuring unit), and the measured result (the pressure of the semi-clean chamber (within the casing 101)) Pd of the pressure gauge 6d (the second internal pressure measuring unit).

$Pa<Pb<Pc$ $Pa<Pd<Pc$

Further, it is sufficient that the proper range of the differential pressure between the adjacent spaces is set as already described.

As mentioned above, in accordance with the present embodiment, the space within the casing 120 to which the wafer 104 is exposed for a comparatively long time for the outer appearance inspection is set to "clean chamber", and the space within the casing 101 in which the air fed to the clean chamber exists, and the space within the casing 100 to which the wafer 104 is exposed for a long time next to the clean chamber for the feeding work or the like are set to "semi-clean chamber".

In this case, in the present embodiment, if the gate 123 and the shutter 122 are opened, the airtightness of the casing 100 and the casing 120 is lowered, and the differential pressure with respect to the adjacent space to the space within the casing 100 and 120 tends to be temporarily reduced. Since the control of each of the fans in accordance with the control procedure mentioned above is continued by the fan control unit even in the case mentioned above, the differential pressure between the adjacent spaces reaches stable.

However, in the case that it is necessary to more strictly maintain the differential pressure, since the timing for opening the gate 123 and the shutter 122 is based on the processing procedure in accordance with the previously stored program and the operation signal from the input apparatus 133 by the operator, the structure may be made so as to increase and decrease the rotating speed of the fan for a fixed time while measuring the time by a timer 132e for corresponding to the reduction of the specific differential pressure before and after the gate 123 and the shutter 122 are actually opened, if the structure is made so as to take the signals Sg and Ss indicating the open of the gate 123 and the shutter 122 via the input portion 132a in the control apparatus 132.

Embodiment 2

Figure 12:
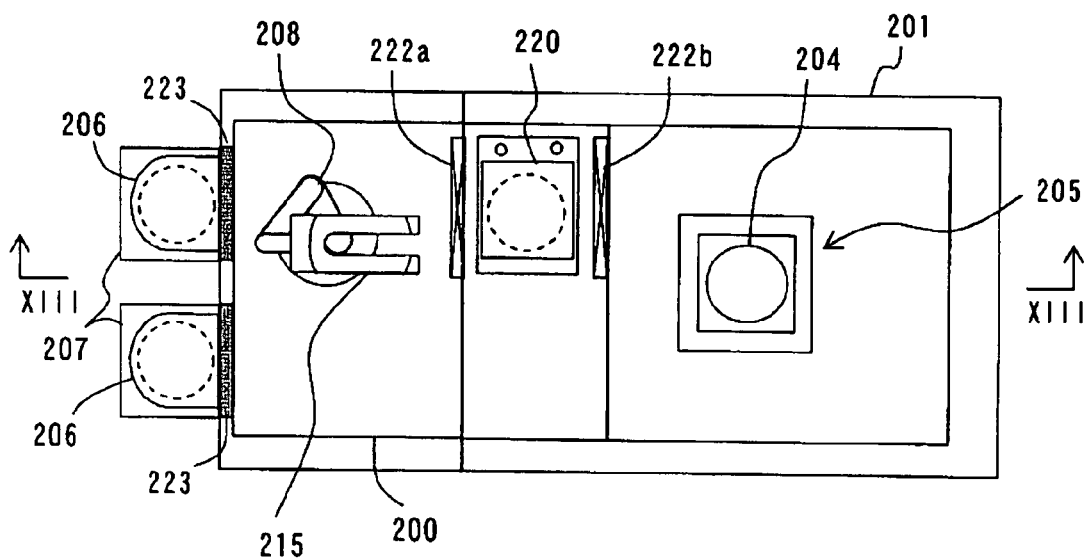
FIG. 12 is a horizontal cross sectional view schematically showing a structure of the other inspection apparatus to which the mini environment apparatus in accordance with the present invention is applied.
Figure 13:
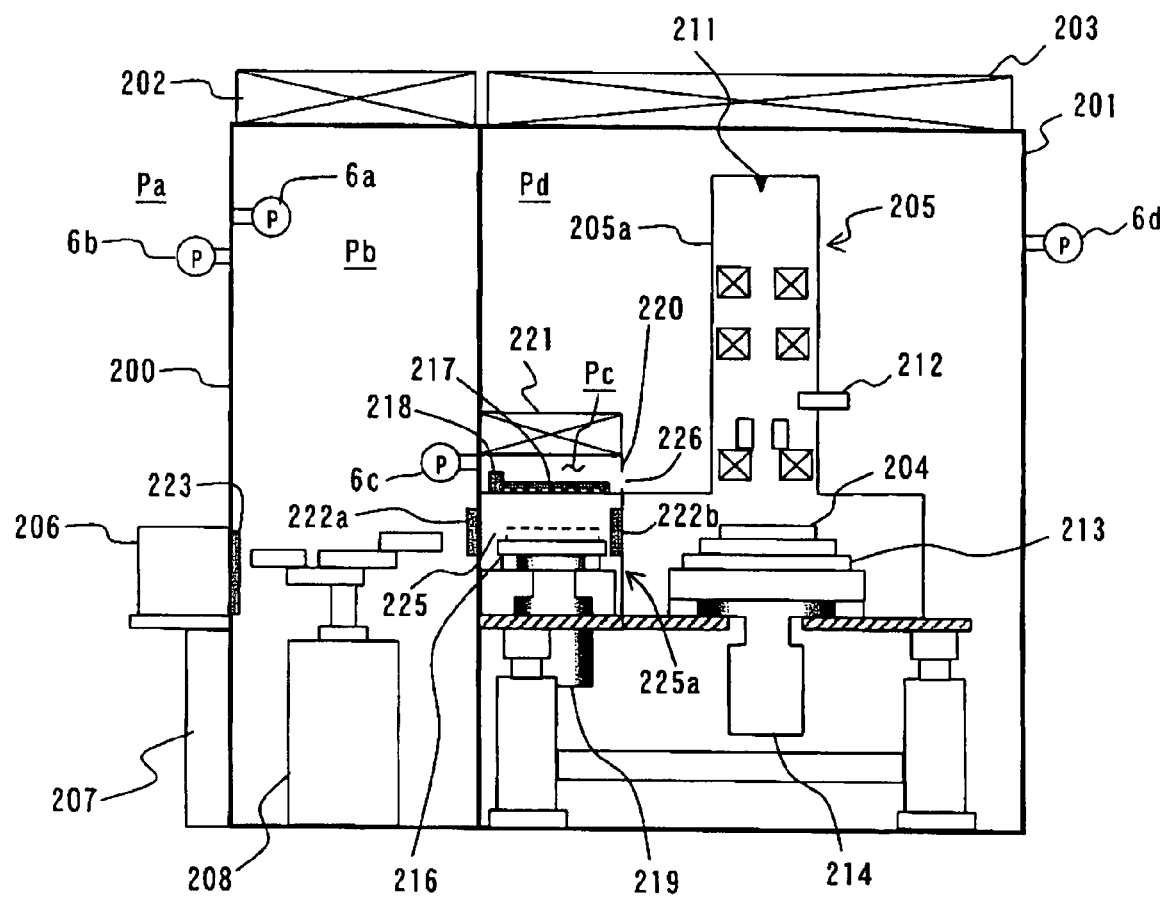
FIG. 13 is a cross sectional view along a line XIII-XIII in FIG. 12.

FIG. 12 is a horizontal cross sectional view schematically showing a structure of the other inspection apparatus to which the mini environment apparatus in accordance with the present invention is applied, and FIG. 13 is a cross sectional view along a line XIII-XIII in FIG. 12.

The inspection apparatus in accordance with the present embodiment exemplifies a CD-SEM or a review SEM employing an electron microscope, and is used, for example, for observing a semiconductor device. The present embodiment can be applied to an FIB apparatus, an FIB-SEM, a TEM and an STEM in the same manner.

The mini environment structure of the present inspection apparatus is close to the embodiment in FIG. 7 in the respective embodiments shown in FIGS. 1 to 7. Respective intake ports and FFU 202 and 203 for covering the intake ports are installed in top plates of two adjacent casings 200 and 201 respectively forming an atmospheric air carrier unit and a main body of an inspection chamber. A casing 220 defining a load lock chamber is arranged in an inner portion of the casing 201. An intake port and an FFU 221 for covering the intake port are provided in a top plate of the casing 220. In other words, internal spaces of the casings 200 and 201 to which the air in the external environment is fed via the FFU 202 and 203 correspond to "semi-clean chamber", and an internal space of the casing 220 to which the air within the casing 201 is fed via the FFU 221 corresponds to "clean chamber".

Further, the casing 220 is arranged between a wall surface isolating the casings 200 and 201 and a sample chamber 205a of the SEM 205, and is structured so as to communicate with an internal space of the casing 200 and a space of the sample chamber 205a if the gates 222a and 222b are opened. Further, the casing 200 is provided with a gate 223 for taking the wafer 204 in and out the external environment.

The present inspection apparatus is provided with the SEM 205 observing the sample (the wafer in the present embodiment) 204, a load port 207 mounting a wafer pod 206 accommodating the wafer 204 observed in the SEM 205, a carrier robot 208 feeding the wafer 204 between the load port 207 and the SEM 205, and a controller (not shown) controlling and data processing the various mounted devices.

The SEM 205 is provided with a sample chamber 205a, an electron source 211, a secondary electron detector 212, a sample stage 213, a vacuum pump 214 evacuating the sample chamber 205a and the like. The wafer 204 is mounted on the sample stage 213 via the carrier robot 208, the load lock chamber 225 and a vacuum transfer unit (not shown), sequentially. Next, an electron beam brought out from the electron source 211 is irradiated on the wafer 204, and a secondary electron from the wafer 204 is detected by the secondary electron detector 212. An SEM image of the wafer 204 is obtained by an image forming portion or the like within the controller by synchronizing a scanning signal of the electron beam to a detection signal of the secondary electron.

The carrier robot 208 is provided with a carrier arm 215 taking up the wafer 204 so as to move within a horizontal plane and a vertical plane. The structure of the controller is approximately the same as the previous embodiment 1.

A casing 225a serving as the load lock chamber 225 is provided with a shutter 217 isolating an atmospheric air chamber in the side of the FFU 221 and a space in which the sample stage 216 is accommodated, a driving mechanism 218 of the shutter 217, a vacuum pump 219 evacuating the space in the side of the sample stage 216 in a state in which the shutter 217 is closed, a casing 220 defining the clean chamber, and an exhaust port 226. After the clean air from the FFU 221 is supplied to the clean chamber within the casing 220, the clean air is discharged from the exhaust port 226, and the differential pressure between the clean chamber within the casing 220 and the space within the casing 201 is maintained.

For example, in the case that the wafer 204 is fed to the SEM 205 from the wafer pod 206, and the wafer 204 is SEM observed, the wafer 204 within the wafer pod 206 is taken up by the carrier arm 215 by opening the gate 223, and is mounted on the sample stage 216 by the carrier arm 215 by opening the gate 222a. Thereafter, the gate 222a in the side of the atmospheric air carrier unit is closed, and the vacuum exhaust within the load lock chamber 225 is executed by the vacuum pump 216. At this time, the shutter 217 and the gate 222b are in a closed state. If the load lock chamber 225 is set to the vacuum state, the gate 222b in the side of the SEM 205 is opened, the wafer 204 is moved into the vacuum sample chamber 205a by the vacuum transfer unit, and the SEM image is obtained by irradiating the electron beam on the wafer 204 on the sample stage 213.

In the case of returning the wafer 204 after the inspection to the wafer pod 206, the gate 222b is opened, and the wafer 204 is moved on the sample stage 216 by the vacuum transfer unit. Next, the gate 222b is closed, a gas such as $N_2$, air or the like having a controlled dew point is supplied from a gas supply unit (not shown) via a line filter (not shown), and a leak (an atmospheric air release) of the load lock chamber 225 is executed. A pressure within the load lock chamber 225 is detected by a pressure measuring unit constituted by a pressure sensor (not shown). When the pressure becomes approximately equal to the pressure Pc within the casing 220 or becomes somewhat lower, the shutter 217 is opened by the driving mechanism 218, the clean air is supplied from the FFU 221 and an atmospheric air environment is formed around the sample stage 216. The dust within the load lock chamber 225 rolling up at a time of the leak mentioned above is quickly calmed by the supplied clean air, and it is possible to inhibit the dust from being attached to the surface of the wafer 204. Thereafter, the gate 222a is opened, the wafer 204 on the sample stage 216 is transferred to the wafer pod 206 by the carrier robot 208, and the gate 223 is closed.

As mentioned above, in the present embodiment, since the inspection chamber is under the vacuum environment, the load lock chamber is defined as the specific cleaning region in the working region which may become under the atmospheric air environment by the casing 220 so as to form "clean chamber", and the space within the casing 201 storing the air fed to the load lock chamber 225, and the space within the casing 200 in which the carrier robot 208 is arranged are formed as "semi-clean chamber". Further, in the same manner as the embodiment previously shown in FIG. 7, a plurality of pressure measuring units constituted by the pressure gauges 6a to 6d are provided at the predetermined positions for measuring the pressures of the respective spaces and the external environment.

The fan of each of the FFU 202, 203 and 221 is controlled by the control apparatus (not shown) on the basis of the measured result of the pressure gauges 6a to 6d. The control procedure of each of the fans of the FFU 202, 203 and 221 by the control apparatus can be set to the same as the embodiments mentioned above. In the case of the present embodiment, the following relation exists among the magnitudes of the measured result (the pressure of the external environment) Pa of the pressure gauge 6a (the external pressure measuring unit), the measured result (the pressure of the semi-clean chamber (within the casing 200)) Pb of the pressure gauge 6b (the first internal pressure measuring unit), the measured result (the pressure of the clean chamber (within the casing 220)) Pc of the pressure gauge 6c (the clean chamber pressure measuring unit), and the measured result (the pressure of the semi-clean chamber (within the casing 201)) Pd of the pressure gauge 6d (the second internal pressure measuring unit).

Pa<Pb<Pc
Pa<Pd<Pc

Further, it is sufficient that the proper range of the differential pressure between the adjacent spaces is set as already described.

In addition, as described in the embodiment 1, the structure may be made such that the open signal of each of the shutters and the gates is input to the control apparatus, and the control is executed together for suppressing the differential pressure change when the shutters and the gates are opened.

Embodiment 3

Figure 14:
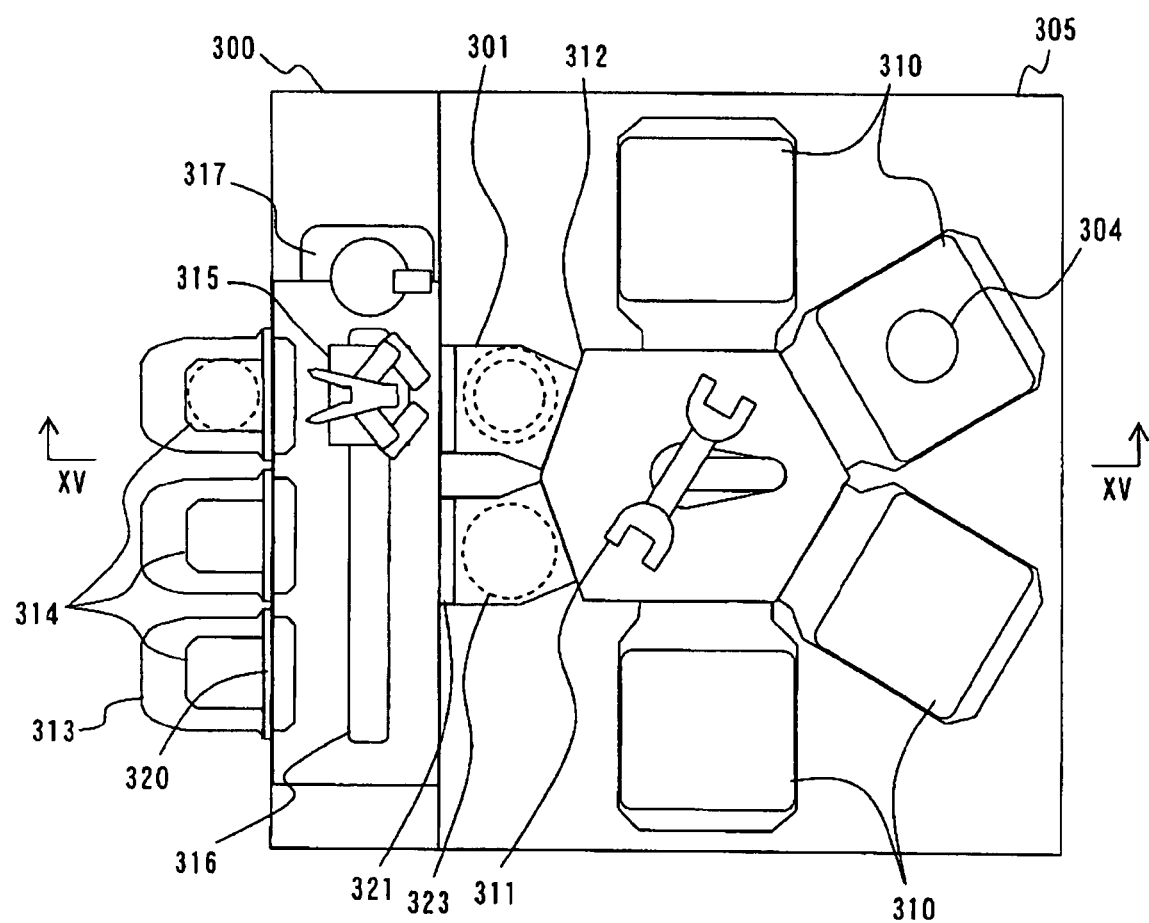
FIG. 14 is a horizontal cross sectional view schematically showing a structure of a semiconductor manufacturing apparatus to which the mini environment apparatus in accordance with the present invention is applied.
Figure 15:
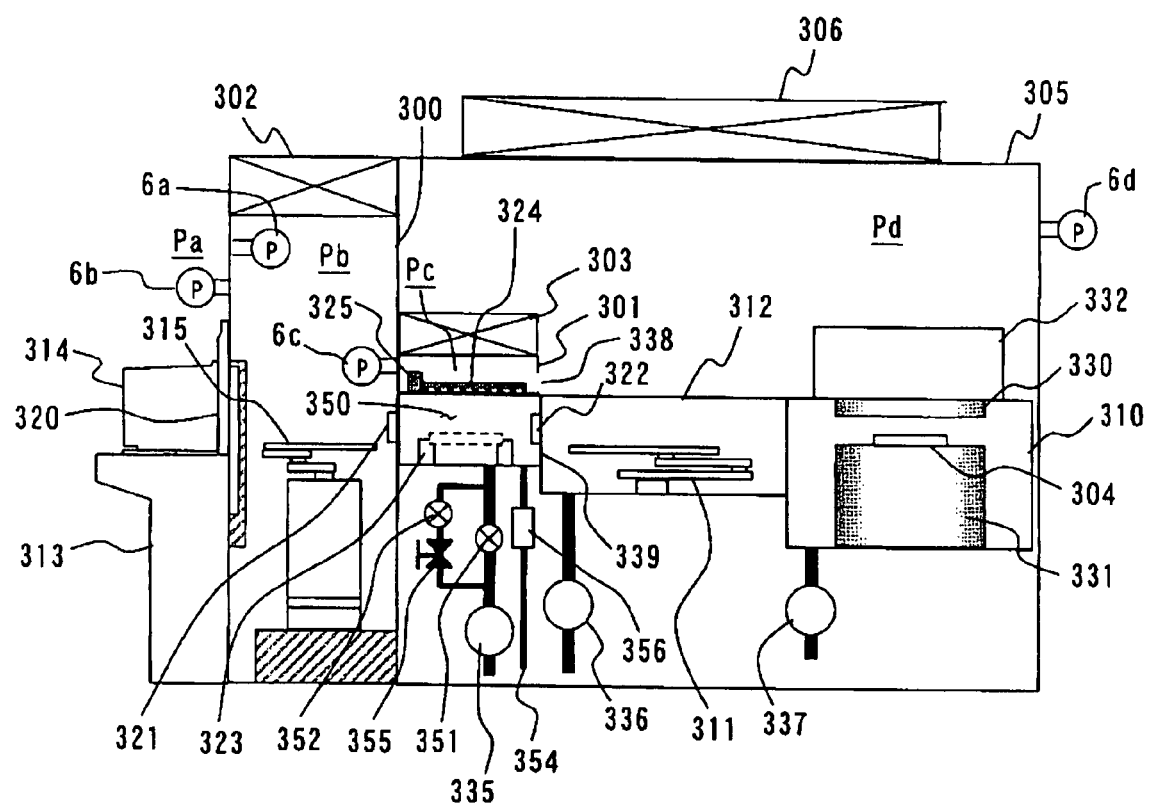
FIG. 15 is a cross sectional view along a line XV-XV in FIG. 14.

FIG. 14 is a horizontal cross sectional view schematically showing a structure of a semiconductor manufacturing apparatus to which the mini environment apparatus in accordance with the present invention is applied, and FIG. 15 is a cross sectional view along a line XV-XV in FIG. 14.

The semiconductor manufacturing apparatus in accordance with the present embodiment is typified, for example, by a dry etching apparatus, a plasma CVD apparatus and a thermal CVD apparatus. The present embodiment is approximately equal to the embodiment 2 in the mini environment structure and the control of the fan.

In the mini environment structure of the present manufacturing apparatus, "semi-clean chamber" is defined by a casing 300 to which the air is fed from the external environment by an FFU 302. A casing 305 adjacent to the casing 300 is "semi-clean chamber" to which the air is fed from the external environment by an FFU 306. Further, "clean chamber" defined by a casing 301 is arranged in the casing 305. The air is fed into the casing 301 serving as the clean chamber from the semi-clean chamber within the casing 300 by an FFU 303.

The "semi-clean chamber" defined by the casing 305 is provided with a plurality of processing chambers 310, a vacuum carrier chamber 312 having a vacuum carrier robot 311 feeding a wafer 304 between the processing chambers 310 and a load lock chamber (the casing 301), and the load lock chamber (the casing 301).

The "semi-clean chamber" defined by the casing 300 is provided with an atmospheric air carrier robot 315 feeding the wafer 304 between a wafer pod 314 on a load port 313 adjacent to the casing 300 and the load lock chamber, a Y-axis unit 316 moving the atmospheric air carrier robot 315 in a direction of one axis, and an alignment unit 317 aligning a position or the like in a peripheral direction of the wafer 304.

Further, the casing 300 is provided with a gate 320 isolating from the wafer pod 314 on the load port 313, and space within the wafer pod 314 is communicated with the space within the casing 300 on the basis of the opening of the gate 320. Further, gates 321 and 322 are provided in the atmospheric air carrier robot 315 side and the vacuum carrier robot 311 side in a casing 339 of a load lock chamber 350, and respectively isolate the semi-clean chamber and the vacuum carrier chamber 312 within the casing 300, and the load lock chamber 350. The casing 301 defining the clean chamber provided with an exhaust port 338 is arranged in an upper portion of the casing 339 of the load lock chamber 350, and there are provided a shutter 324 isolating an internal space of the casing 301 into two spaces including an atmospheric air chamber in the FFU 303 side and a vacuum chamber in a sample stage 323 side, and a driving mechanism 325 thereof. The clean air from the FFU 303 is supplied to the clean chamber within the casing 301 and is thereafter discharged from the exhaust port 226, and a differential pressure between the clean chamber within the casing 301 and the space within the casing 305 is maintained.

The processing chamber 310 is a known structure as this kind of structure, and is provided with an upper electrode (or a gas supply head) 330, a lower electrode (or a susceptor provided with a heating unit) 331, a matching box 332 and the like. Further, vacuum pumps 335, 336 and 337 evacuating the spaces are connected to the load lock chamber 350, the vacuum carrier chamber 312 and the processing chamber 310. Between the load lock chamber 350 and the vacuum pump 335, there are arranged a main exhaust gas piping for maintaining a vacuum state within the load lock chamber 350, and an air conditioning exhaust gas piping for allowing the clean air of the FFU 303 to form an air stream downward when the inner side of the load lock chamber 350 comes to the atmospheric air state. The air conditioning exhaust piping is provided with a control unit such as an air valve 352 or the like, and a flow rate regulating unit such as a needle valve 355 or the like, and the structure is made so as to be capable of exhausting the ambient atmosphere within the load lock chamber 350 at a predetermined flow rate.

For example, in the case that the wafer 304 is fed to the processing chamber 310 from the wafer pod 314, and a film forming process or an etching process is applied onto the wafer 304, the gate 321 is opened and the wafer 304 is mounted on the sample stage 323 within the load lock chamber 350 after opening a Boltz plate so s to take up the wafer 304 within the wafer pod 314 by the atmospheric air carrier robot 315, and aligning by the alignment unit 317. Thereafter, the gate 321 in the side of the atmospheric air carrier robot 315 is closed, and space around the sample stage 323 within the load lock chamber 350 is set to the vacuum state by executing the vacuum exhaust via the main exhaust gas piping by the vacuum pump 335. At this time, the shutter 324 and the gate 322 are in the closed state, and the vacuum state is formed within the vacuum carrier chamber 312 and the processing chamber 310. If the vacuum state is formed around the sample stage 323, the shutter 322 in the side of the vacuum carrier chamber 312 is opened, the wafer 304 is mounted on the lower electrode 331 within the processing chamber 310 via the vacuum carrier robot 311, and a predetermined process is applied to the wafer 304.

In the case that the processed wafer 304 is returned to the wafer pod 314, the shutter 322 is opened, and the wafer 304 is moved onto the sample stage 323 within the load lock chamber 350 under the vacuum environment via the vacuum carrier robot 311. Next, the gate 322 and the valve 351 are closed, the gas such as $N_2$, air or the like having a controlled dew point is supplied from a gas supply unit 354 via a line filter 356, and a leak (an atmospheric air release) of the load lock chamber 350 is executed. A pressure within the load lock chamber 350 is detected by a pressure measuring unit constituted by a pressure sensor (not shown). When the pressure becomes approximately equal to the pressure Pc within the casing 301 or becomes somewhat lower, the gas supply from the gas supply unit 354 is stopped, the shutter 324 is opened so as to supply the clean air from the FFU 303 and form an atmospheric air environment around the sample stage 323. The air valve 352 of the air conditioning exhaust gas piping is opened approximately at the same time or about that time of opening the shutter 324, the downstream air flow of the clean air is formed. The dust within the load lock chamber 350 rolling up at a time of the leak mentioned above is quickly replaced by the clean air, and it is possible to inhibit the dust from being attached to the surface of the wafer 304. Thereafter, the gate 321 is opened, the wafer 304 on the sample stage 323 is transferred to the wafer pod 314 by the atmospheric air carrier robot 315, and the gate 320 is closed.

As mentioned above, in the present embodiment, since the processing chamber 310 is under the vacuum environment, the load lock chamber 350 is defined as a specific cleaning region in working region which may become under the atmospheric air environment by the casing 301 so as to form "clean chamber", and the space within the casing 305 storing the air fed to the load lock chamber 350, and the space within the casing 300 in which the carrier robot 315 is arranged are formed as "semi-clean chamber". The pressures of the external environment of the casing 300, the sub-clean chamber within the casing 300, the clean chamber within the casing 301, and the semi-clean chamber within the casing 305 are respectively measured by a plurality of pressure measuring units constituted by the pressure gauges 6a to 6d, and the fan control unit controls the rotating speed of each of the fans of the FFU 302, 303 and 306 on the basis of the measured result of the pressure gauges 6a to 6d, and maintains the differential pressure of the external environment, the semi-clean chamber and the clean chamber.

The control procedure of each of the fans of the FFU 302, 303 and 306 by the control apparatus (not shown) can be set to the same as the embodiments mentioned above including the control of the differential pressure maintenance at a time of opening the gate and the shutter. In the case of the present embodiment, the following relation exists among the magnitudes of the measured result (the pressure of the external environment) Pa of the pressure gauge 6a (the external pressure measuring unit), the measured result (the pressure of the semi-clean chamber (the casing 300)) Pb of the pressure gauge 6b (the first internal pressure measuring unit), the measured result (the pressure of the clean chamber (the casing 301)) Pc of the pressure gauge 6c (the clean chamber pressure measuring unit), and the measured result (the pressure of the semi-clean chamber (the casing 305)) Pd of the pressure gauge 6d (the second internal pressure measuring unit).

Pa<Pb<Pc
Pa<Pd<Pc

The description is given above of the examples in which the mini environment apparatus in accordance with the present invention is applied to the various apparatuses as the embodiments with reference to FIGS. 8 to 15, however, the applied examples are not limited to them. For example, the present invention can be applied to a coater/developer apparatus coating or developing a photosensitive material on the wafer surface, an inspection apparatus of a liquid crystal and a hard disc, a thermal processing apparatus and a low-pressure CDV apparatus diffusing impurities, and the other inspection apparatuses and manufacturing apparatuses in which a clean working environment is required.

What is claimed is:

1. An inspection apparatus for detecting a defect on a substrate, comprising:
    a first casing having a first fan-filter-unit;
    a second casing having a second fan-filter-unit, the second casing is smaller than the first casing and being adjacent to the first casing;
    a clean chamber which is defined by a part of wall of the first casing and the second casing;
    a shutter arranged on the wall of the first casing to communicate with the clean chamber;
    a third casing having a third fan-filter-unit and surrounding the second casing;
    a pod for accommodating the substrate;
    a carrier apparatus for carrying the substrate from the pod to the clean chamber and being arranged in the first casing;
    an optical type inspection apparatus for inspecting a defect on the substrate and being arranged in the clean chamber;
    a first pressure measuring unit for measuring a first pressure in an external environment;
    a second pressure measuring unit for measuring a second pressure within the first casing;
    a third pressure measuring unit for measuring a third pressure within the clean chamber;
    a fourth pressure measuring unit for measuring a fourth pressure within the third casing; and
    a control unit for controlling the first, second and third fan-filter-units based on the first, second and third pressures.

* * * * *